Nov. 16, 1965 R. F. SHAW 3,218,609

DIGITAL CHARACTER MAGNITUDE COMPARATOR

Filed March 23, 1960

INVENTOR.
Robert F. Shaw

BY S. C. Yuter

ATTORNEY

United States Patent Office 3,218,609
Patented Nov. 16, 1965

3,218,609

DIGITAL CHARACTER MAGNITUDE COMPARATOR

Robert F. Shaw, Locust Valley, N.Y., assignor to Digitronics Corporation, Albertson, N.Y., a corporation of Delaware Filed Mar. 23, 1960, Ser. No. 16,985
14 Claims. (Cl. 340—146.2)

Figure 1:
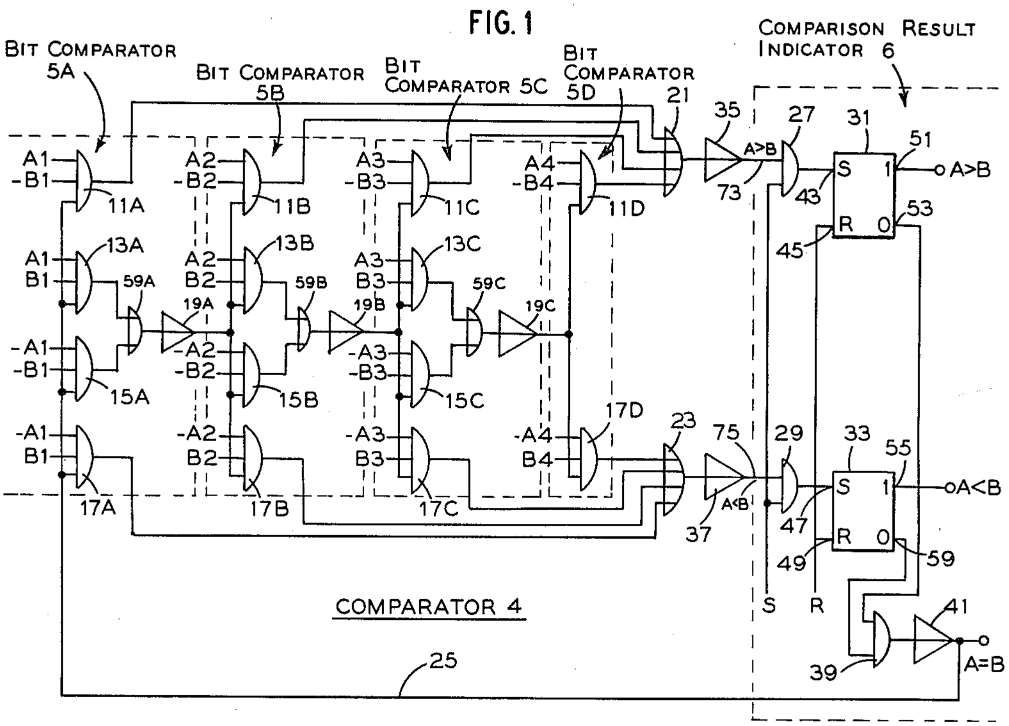

This invention relates to comparators for binary coded digital data, and more specifically to comparators for data, in which the bits of each of the two binary numbers to be compared are presented in parallel, and in which successive parallel groups of bits may be presented serially. Such data are commonly referred to as "bit-parallel, character-serial" data. An example of such a situation occurs quite frequently in modern data processing in which the six bits making up a binary coded alphanumeric character are presented in parallel, but in which successive characters are presented serially.

It is often necessary to compare the magnitudes of two such digital data presentations in order to perform data processing operations such as sequencing or collation. In such applications items consisting of a considerable number of binary coded alphanumeric characters are to be arranged by comparing certain specified groups of characters from each of two items. These groups are commonly referred to as "designator fields" or "key fields" and consist of several alphanumeric characters which serve to identify the item. Such a designator field may be an account number, or a name and address, or other identifying information.

In modern file processing equipment, it is sometimes desirable to achieve higher rates of operation by making several such comparisons simultaneously. This requires, in the interest of economy, a comparator which uses a minimum of equipment in order that the provision in a single data processing system of three or more such comparators may not add unduly to the cost of the entire system. It is also desirable that the comparator should be easily changed from one which compares successive characters most significant first, to one which compares successive characters least significant first.

Since most modern data processing systems use transistorized circuitry, it is also desirable that the comparator be well adapted to transistor circuits, which have the characteristic, that the number of logical elements making up a chain, is rather limited. In general, such chains are confined to one "and" circuit followed by one "or" circuit. Thus the comparator should contain as few situations as possible requiring longer logical chains.

It is accordingly an object of this invention to provide an improved comparator for bit parallel, digit serial data.

It is another object of the invention to provide a circuit which is adaptable with a minimum of change for comparing data occurring either most-significant-character-first or least-significant-character-first.

It is a further object of the invention to provide a comparator of the nature specified, in which the logical configuration is well adapted to transistor circuitry.

It is a still further object of the invention to provide a comparator which is made up of a number of identical sub-units in order to achieve further economy in construction.

Briefly, in accordance with the invention, apparatus is provided for comparing first and second units of data represented by characters with each character being a coded combination of N bits in parallel. The apparatus includes at least $N-1$ bit comparators each comparing a different order bit of the characters. For example, the first bit comparator compares the highest order bits of the characters. Each bit comparator includes first means for indicating an inequality of a first sense between the bits being compared, second means for indicating an inequality of a second sense between the bits being compared, and third means for indicating an equality between the bits being compared. Each of the lower order bit comparators is responsive to the third means of the next higher order bit comparator. Thus, for example, the second highest order bit comparator does not perform comparisons unless the bits being compared by the highest order bit comparator are equal.

First indicator means is responsive to the first means of all the bit comparators for giving an indication if any of the first means indicates an inequality of the first sense. And second indicator means is responsive to the second means of all the bit comparators for giving an indication if any of the first means indicates an inequality of the second sense.

Figure 2:
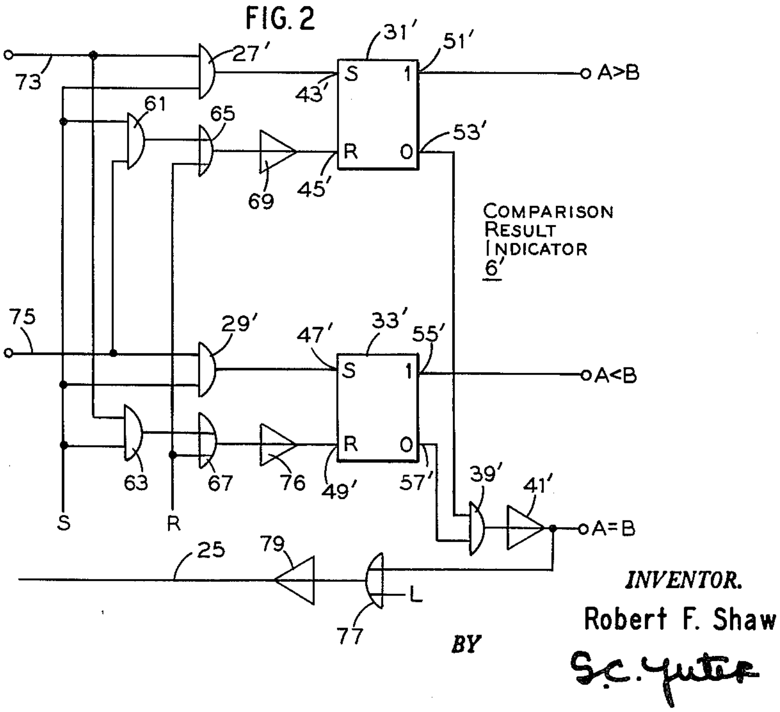

Other objects, features and advantages of this invention will be apparent from the following detailed description when read with the accompanying drawings, wherein:

FIGURE 1 shows a comparator, including a plurality of "bit comparators" and a comparison result indicator in block symbol form, which performs comparisons most-significant-character-first, in accordance with the invention; and FIGURE 2 shows an alternate embodiment of the comparison result indicator in block symbol form, in which a change from most-significant-character-first comparison to least-significant-character-first comparison is achieved, showing the manner in which such a change can be accomplished through the application of a single control signal.

In FIGURE 1 the two characters to be compared are designated A and B, and their respective binary digits or bits are designated A1, A2, A3 and A4; B1, B2, B3 and B4 respectively. A1 indicates the most significant bit of A, B1 the most significant bit of B, and remaining bits of A and B are numbered in order of decreasing significance. Signals representing each bit are presented in push-pull form; that is, both positive and negative signals corresopnding to each bit are provided. Such signals are sometimes termed phase and paraphase signals respectively. For example, both A1 and —A1 are presented to the comparator and the same is true for all other bits of the characters being compared.

Direct comparison is made only between bits of like significance in the characters A and B, although the result of any such comparison may be reflected in the comparison of lower order bits. The comparison, for example, between the most significant bits of A and B is made by the four "and" gates 11A, 13A, 15A and 17A. Line 25, which is common to these four "and" gates, provides enabling potential to them. When the enabling potential is present, a particular one of the four "and" gates will pass signals. For example, it is seen that "and" gate 11A is capable of passing signals on concurrence of the signals A1 and —B1 (and of the enabling potential). Therefore if signal A1 represents binary "one" and signal B1 represents binary "zero," gate 11A will pass a signal corresponding to such "one"–"zero" combination. Under the same conditions none of the other three "and" gates 13, 15A or 17A will pass any signal. Thus, if a signal is obtained from "and" gate 11A, it indicates that the most significant bit of character A is greater than that of character B, indicating an inequality of one sense. On the other hand, if the most significant bit of character B is a "one" and that of character A is a "zero," "and" gate 17A will pass a signal, indicating that in its most significant bit, B is greater than A, so the inequality is of the opposite sense. Finally, if the most significant bits of A and B are identical, either gate 13A will pass a signal or gate 15A will pass a signal, the former occurring if both bits are "ones" and the latter if both bits are "zeros." Since both these cases represent equality of the most significant bits of A and B, the signals from "and" gates 15A and 13A are combined in "or" circuit 59A and are further amplified by amplifier 19A. Amplifier 19A is not logically necessary but is required in most transistor circuitry in order to drive the load which follows. It is an amplifier of the non-inverting types such as an emitter follower.

The configuration just described comprises the entire circuitry for comparing the most significant bits of characters A and B, and may be called the "bit comparator" 5A. Completely identical configurations or "bit comparators" are used to compare the two following bits of A and B respectively. Thus "and" gates 11B, 13B, 15B and 17B together with "or" circuit 59B and amplifier 19B which comprise bit comparator 5B compare the next to the most significant bits of A and B, while "and" gates 11C, 13C, 15C and 17C together with "or" circuit 59C and amplifier 19C which comprise bit comparator 5C compare the bits of A and B which follow in next lower order of significance. Use of a number of identical bit comparators results in an assembly which is simple and economical to produce, and is especially well adapted to applications employing "solid state circuits" in which several elements making up a subcircuit are formed directly out of a single piece of semiconducting material. The least of significant bits of A and B can be compared by only two "and" gates, 11D and 17D, which comprise bit comparator 5C, since an equality comparison is not logically necessary in this case as will be seen later. It should be noted, however, that except for the circuit comparing the least significant bits of A and B, identical configurations of logical elements are used for comparing any two corresponding bits of the characters A and B.

In particular, if A and B contain more than four bits each (for example, if they are alphanumeric characters and therefore contain six bits each), it is only necessary to add enough additional bit comparators to accommodate the additional bits.

In comparing two multi-bit binary characters presented as parallel signals, the two most significant bits are compared, and if these are different the character which contains the "one" is the larger character without regard to the values of any lower order bits. On the other hand, if the most significant bits of the two characters are identical, the next bits in order of significance are examined, and again if these are different the character containing a "one" is the larger, and so on in order of decreasing significance. Stated in a different way, this means that the most significant bits of two characters are examined, and only if they are identical is it necessary to examine the bits of lower order. This principle applies to all corresponding bits in sequence. This logical principle is applied in the present invention by making the examination of each successively lower order pair of bits dependent on the quality of all higher order bits. In particular, it is necessary to get a signal from amplifier 19A of bit comparator 5A indicating equality of the most significant bits of A and B in order to examine the next to the most significant bits of A and B (as represented by signals A2 and B2), and similarly, in order to examine A3 and B3, it is necessary to obtain a signal from amplifier 19B of bit comparator 5B indicating the equality of bits A2 and B2 (which in turn implies that A1 and B1 were also equal, otherwise no signal would have been obtained from either "and" gate 13B or 15B). Thus the examination or comparison of any two bits of A and B of like significance is made dependent on the equality of all pairs of bits of higher order.

Since an output signal from any of the "and" gates 11A, 11B, 11C or 11D represents the fact that A is greater than B, the output terminals of all these "and" gates are combined in "or" circuit 21, the resulting signal is amplified by amplifier 35 (which is again not logically necessary but in practice is usually necessary for reasons of circuit loading) and transmitted to "and" gate 27. On the other hand, an output signal from any of the "and" gates 17A, 17B, 17C and 17D will indicate the fact that B is greater than A, therefore, all of these "and" gates have their output terminals combined through "or" circuit 23, and the resulting signal is amplified by amplifier 37 and transmitted to "and" gate 29. The second input terminal of "and" gates 27 and 29 is an S signal, which is a sampling signal and is used to assure that the output signals from amplifiers 35 and 37 are not examined until all transients resulting from the application of the signals A and B to the comparator 4 have had a chance to decay and that steady state conditions have been reached. When this has occurred (which in practice will be only a very short time, on the order of a microsecond or so after the application of signals A and B), the sampling pulse S applied to "and" gates 27 and 29 will cause one or the other of these "and" gates to pass a signal provided A and B are not equal. If, on the other hand, A and B are identical, neither "and" gate 27 nor "and" gate 29 will pass a signal.

In order to remember the fact that an inequality of either type was detected during the comparison of any two characters A and B, a comparison result indicator comprising two flip-flops 31 and 33 have been provided. These flip-flops are initially reset by a signal R (a reset pulse) before comparison starts—i.e., before comparison of the first characters of the fields. After the examination of any pair of characters A and B, one of these flip-flops or the other will be set unless those characters were equal. In particular, if A were greater than B, flip-flop 31 would be set by a signal from "and" gate 27, while if A were less than B, flip-flop 33 would be set by a signal from "and" gate 29.

Flip-flops 31 and 33 may be of the Eccles-Jordan type which are well known to the art and contain respectively "set" and "reset" terminals and output terminals commonly designated "1" and "0". The characteristics of one of these flip-flops (31, for example) is that if a signal is applied to the "set" terminal 43, an output signal corresponding to the phase or positive signal will be obtained from the "1" output terminal 51. On the other hand, application of a signal to "reset" terminal 45 will result in the appearance of a phase or positive signal at "0" output terminal 53. If the "1" output terminal shows a phase or positive signal the "0" output terminal will show a paraphase or negative signal, and vice versa.

As already noted, in data processing systems it is normally necessary to compare not just one multi-bit character but rather a field or sequence of characters representing either a sequence of coded decimal digits or a sequence of alphanumeric characters. Characters of like significance in their respective fields are always presented to the comparator 4 simultaneously. Now assuming that data are represented in the processing system most-significant-character-first, the first pair of characters to be compared would be the most significant characters of their respective fields. The remarks previously made concerning the logical operation to be performed in comparing successive bits of a character also apply to the comparison of successive characters of a field. In particular, if the most significant characters of a field are equal, the next most significant characters are compared, but if the most significant characters of a field were found to be unequal, then comparisons of subsequent characters are not permitted. Within the comparator 4 this is accomplished by deriving a signal if two corresponding bits were equal and using this signal to permit comparison of the next lower order pair of bits. In an exactly analogous fashion a signal is derived from the two flip-flops 31 and 33 if two compared characters are equal and this signal is used to permit the comparison of characters of lower orders. Thus the "0" output terminals 53 and 57 of flip-flops 31 and 33 respectively are applied to gate 39, and the output of this gate will be present only if neither flip-flop 31 nor 33 has been set. As previously noted, however, this condition will exist after the comparison of a pair of characters only if those characters were equal. If they were equal, "and" gate 39 will pass a signal which is amplified by amplifier 41 (again not a logically necessary element but required for circuit loading reasons) and the output signal of amplifier 41, applied through line 25, will permit the comparison of the most significant bits of the following characters at "and" gates 11A, 13A, 15A and 17A of bit comparator 5A. While an equality signal from the bit comparator 5D would serve this purpose in one sense, it would have to be remembered or stored in an additional flip-flop in order to remain available to influence comparison of later characters. Since the same information is available by proper interpretation of the output signals of flip-flops 31–33, the equality circuits of the bit comparator 5D can be omitted. On the other hand, if comparison of two characters indicates inequality, no signal will appear at line 25 and therefore comparison of the most significant bits of the following character will be prevented. Since comparisons of the most significant bits is prevented, however, comparison of all less significant bits is likewise prevented and therefore no further change in the states of flip-flops 31 or 33 can occur. Therefore after all characters have been presented to comparator 4 in sequence, the final state of flip-flops 31 and 33 will indicate the relative magnitudes of the two fields; if flip-flop 31 is set, field A is greater than field B; if flip-flop 33 is set, field B is greater than field A, and if neither flip-flop 31 nor flip-flop 33 is set, fields A and B are identical.

In many data processing systems it may be desirable to perform comparisons least-significant-character-first rather than most-significant-character-first within a field. This will be particularly true in systems in which arithmetic operations are also performed, since in such systems data normally must be presented least-significant-character-first. FIGURE 2 indicates the changes necessary to the flip-flop circuitry of FIGURE 1 in order to enable comparisons to be made least-significant-character-first.

In comparing least-significant-character-first, successive characters of a field are compared in exactly the way previously described, but instead of disabling the comparator 4 as soon as an inequality is found, comparisons of successive pairs of characters are made to supersede all foregoing comparisons in the same field and only the final state of the output flip-flops, corresponding to the final or most significant inequality of characters discovered in the sequence, is significant. Therefore in order to compare least-significant-character-first it is necessary to rearrange flip-flops 31 and 33 of FIGURE 1 so that the setting of either one of them will cause the resetting of the other, provided the other had been previously set. Furthermore, it is necessary to assure that the occurrence of an inequality in one pair of characters will not prevent comparisons of subsequent pairs in the same field.

Now referring to FIGURE 2, it will be seen that "or" circuit 77 and amplifier 79 have been added in series with line 25. If a control signal L is present, it will override the signal from amplifier 41' at "or" circuit 77, thus preventing any influence of flip-flops 31' or 33' on the comparison of the most significant bits of a new pair of characters. A similar result could have been obtained by simply disconnecting line 25 from "and" gates 11A, 13A, 15A and 17A of bit comparator 5A; the reason for using "or" circuit 77 and control signal L will be discussed later. Two "and" gates 61 and 63 have been added which take care of the resetting of either flip-flop 31' or 33' if a new inequality requires it. For example, appearance of a signal on line 73, indicating that A is greater than B, will not only cause flip-flop 31' to be set through "and" gate 27' when the sampling pulse S occurs but will also cause flip-flop 33' to be reset through "and" gate 63. At the same time it is immaterial whether flip-flop 31' is already set or whether flip-flop 33' is already reset. In order to provide for the initial resetting of flip-flops 31' and 33' by the reset signal R before comparison starts, it has been necessary to add "or" circuits 65 and 67 and consequently to add amplifiers 69 and 76 (which, although again not logically required, are necessary because in the usual transistor circuitry, "or" circuits 65 and 67 will not be able to drive the reset input terminals of flip-flops 31' and 33' directly).

If successive digits of the two fields A and B are compared, flip-flops 31' and 33' will change their states whenever a change occurs in the relative inequality detected from that previously detected, and the final state of flip-flops 31' and 33' will indicate the actual relative magnitudes of fields A and B. In particular, flip-flop 31' will remain set at the end of the comparison if field A exceeded field B. Flip-flop 33' will remain set at the end of the comparison if field B is greater than field A, and neither flip-flop 31' nor 33' will be set at the end of the comparison if the two fields are identical.

In some data processing systems it is desirable to perform comparison either least-significant-character-first or most-significant-character-first, changing from one type of comparison to the other through application of an electrical signal. An example of such an application would be in a file processing system where it is necessary, in order to save time, to operate magnetic tapes in both directions. The reversal of the direction of motion of the tape reverses the sequence in which characters are read into the system. It may be convenient to preserve the sequence of the characters internally just as it comes from the tape. Since the normal sequence is most-significant-character-first, this sequence would correspond to the forward pass; that is, a cycle in which the tapes are running in the normal direction; but on alternate passes of the tape through the system it would be necessary to make comparisons least-significant-character-first.

Therefore in order to make the comparator easily changeable to compare data either least-significant-character-first or most-significant-character-first, the "or" circuit 77 has been inserted in series with line 25 as previously noted. When the signal L is present, as already described, it overrides any signal from amplifier 41' and allows the bit comparator 5A for the most significant bit to operate regardless of the states of flip-flops 31' and 33'. This is the condition for comparing least-significant-character-first. If, however, it is necessary to compare most-significant-character-first, it is only necessary to terminate signal L, allowing amplifier 41' to transmit a signal unhindered through "or" circuit 77, amplifier 79, and line 25, and therefore requiring an indication of equality (as indicated by flip-flops 31' and 33' remaining reset) in order to compare further characters. As explained in connection with the comparator 4 of FIGURE 1, the occurrence of an inequality will cause one of the flip-flops 31' or 33' to be set, resulting in the disappearance of the equality signal from amplifier 41' and consequently preventing the comparison of any subsequent characters. The addition "and" gates 61 and 63 in the case of comparison of data most-significant-character-first is not significant and does not interfere in any way with such comparison, since these "and" gates assume significance only in the case where a comparison signal on line 73 or 75 occurs after one of the flip-flops 31' or 33' has been set. This, however, will never occur during most-significant-character-first comparison because the occurrence of an inequality in any character of the field prevents any further comparisons in that field.

Thus the possible variations of the invention are summarized in FIGURES 1 and 2. Specifically, first is shown the arrangement for comparing most-significant-character-first only, in which case "and" gates 61 and 63, "or" circuit 77 and amplifier 79 can be omitted. Second, the arrangement for comparing least-significant-character-first only is shown, in which case "and" gates 61 and 63 are necessary but "or" circuit 77, amplifier 79 and line 25 can be omitted. Finally is shown the arrangement for comparing in either fashion, according to the presence or absence of the control signal L, in which case all the elements mentioned are required. In any individual installation, of course, only those elements needed for the specific application would be included. It therefore appears that relatively small changes in the intercharacter coupling circuitry (consisting of gating means connecting "or" circuits 21 and 23 to flip-flops 31 and 33, and the additional gating means connecting flip-flops 31 and 33 to the bit comparator 5A for the most significant bits) can transform the comparator 4 from most-significant-character-first to least-significant-character-first operation, or can make it adaptable for either with switching from one to the other by application of a single control signal.

There has thus been shown an improved comparator for comparing fields in a bit-parallel, character-serial manner. By employing bit comparators, each comparing different order bits of the characters wherein the operation of a bit comparator is controlled by the sensing of an equality indication by the next higher order bit comparator, the comparator requires a minimum of apparatus. In addition, the comparator in accordance with the invention is readily adaptable to perform comparison either most-significant-character-first or least-significant-character-first.

There will now be obvious to those skilled in the art many modifications and variations utilizing the principles set forth and realizing many or all of the objects and advantages, but which do not depart essentially from the spirit of the invention.

What is claimed is:

1. Apparatus for comparing first and second units of data represented by groups of serial characters wherein each character is a coded combination of N bits in parallel, comprising: at least $N-1$ bit comparators, each comparing a different order bit of the characters, each of said bit comparators including identical first means for giving a first indication if an inequality of a first sense exists between the bits being compared, identical second means for giving a second indication if an inequality of a second sense exists between the bits being compared, each of said first means of said bit comparators having the same number of inputs, each of said second means of said bit comparators having the same number of inputs, and third means for giving a third indication if an equality exists between the bits being compared, each of said first, second and third means of each of the bit comparators comparing the lower order bits of the characters being controlled by the third means of the next higher order bit comparator to operate only when said third means gives an indication; first indicator means responsive to the first means of all of said bit comparators for giving an indication whenever any of said first means gives an indication; and second indicator means responsive to said second means of all of said bit comparators for giving an indication whenever any of said second means gives an indication.

2. Apparatus for serially comparing the group of characters representing first and second units of data wherein each character is a coded combination of N bits in parallel, comprising: at least $N-1$ bit comparators, each comparing a different order bit of the characters, each of said bit comparators including identical first means for giving a first indication if an inequality of a first sense exists between the bits being compared, identical second means for giving a second indication if an inequality of a second sense exists between the bits being compared, each of said first means of said bit comparators having the same number of inputs, each of said second means of said bit comparators having the same number of inputs, and third means for giving a third indication if an equality exists between the bits being compared, each of the bit comparators comparing the lower order bits of the characters being controlled by only the third means of the next higher order bit comparator to operate only when said third means gives an indication; first storage means responsive to the first means of all of said bit comparators for giving an indication whenever any of said first means gives an indication, regardless of the relative magnitudes of previously compared characters; second storage means responsive to the second means of all of said bit comparators for giving an indication whenever any of said second means gives an indication, regardless of the relative magnitudes of previously compared characters; and means responsive to said storage means for giving an indication of the equality of the compared first and second units of data.

3. Apparatus for serially comparing most-significant-character-first the groups of characters representing first and second units of data wherein each character is a coded combination of N bits in parallel, comprising: at least $N-1$ bit comparators, each comparing a different order bit of the characters, each of said bit comparators including first means for giving a first indication if an inequality of a first sense exists between the bits being compared, second means for giving a second indication if an inequality of a second sense exists between the bits being compared, and third means for giving a third indication if an equality exists between the bits being compared, each of the bit comparators comparing the lower order bits of the characters being responsive to the third means of the next higher order bit comparator to operate only when said third means gives an indication; first storage means responsive to the first means of all of said bit comparators for giving an indication whenever any of said first means gives an indication regardless of the relative magnitudes of previously compared characters; second storage means responsive to the second means of all of said bit comparators for giving an indication whenever any of said second means gives an indication regardless of the relative magnitudes of the previously compared characters; and means responsive to said first and second storage means for preventing further operation of the highest order bit comparator whenever either of said storage means gives an indication.

4. Apparatus for serially comparing least-significant-character-first the groups of characters representing first and second units of data wherein each character is a coded combination of N bits in parallel, comprising: at least $N-1$ bit comparators, each comparing a different order bit of the characters, each of said bit comparators including first means for giving a first indication if an inequality of a first sense exists between the bits being compared, second means for giving a second indication if an inequality of a second sense exists between the bits being compared, and third means for giving a third indication if an equality exists between the bits being compared, each of the bit comparators comparing the lower order bits of the characters being responsive to the third means of the next higher order bit comparator to operate only when said third means gives an indication; first two state storage means responsive to the first means of all said bit comparators which assumes a first state whenever any of said first means gives an indication; second two state storage means responsive to the second means of all of said bit comparators which assumes a first state whenever any of said second means gives an indication; means for forcing said first storage means to a second state whenever said second storage means assumes a first state; and means for forcing said second storage means to a second state whenever said first storage means assumes a first state.

5. The apparatus of claim 4 for controllably serially comparing most-or-least-significant-character-first including controllable means responsive to said first and second two state storage means for controlling the operation of the highest order bit comparator.

6. Apparatus for serially comparing the characters of first and second units of data wherein each character is a coded combination of N bits in parallel, the bits being represented by the first and second states of a bit signal, comprising: at least $N-1$ bit comparators, each comparing a different order bit of the characters, each of said bit comparators including identical first means for transmitting a first signal when a bit of the first unit is represented by the first state of said bit signal and the corresponding bit of the second unit is represented by the second state of said bit signal, identical second means for transmitting a second signal when a bit of the second unit is represented by the first state of said bit signal and the corresponding bit of the first unit is represented by the first state of said bit signal, and identical third means for transmitting a third signal whenever the corresponding bits of said first and second units are represented by the same state of said bit signal, each of said first means of said bit comparators having the same number of inputs, each of said second means of said bit comparators having the same number of inputs each of said third means of said bit comparators having the same number of inputs, each of the bit comparators comparing the lower order bits of the characters being responsive to the third means of the next higher order bit comparator to operate only when said third means transmits said third signal; first indicator means responsive to the first means of all of said bit comparators for transmitting a fourth signal whenever any of said first means transmits a first signal; and second indicator means responsive to the second means of all of said bit comparators for transmitting a fifth signal whenever any of said second means transmits a second signal; the presence or absence of said fourth and fifth signals indicating the relative magnitudes of said first and second units of data.

7. Apparatus for serially comparing most-significant-character-first the characters of first and second units of data wherein each character is a coded combination of N bits in parallel, the bits being represented by the first and second states of a bit signal, comprising: at least $N-1$ bit comparators, each comparing a different order bit of the characters, each of said bit comparators including first means for transmitting a first signal when a bit of the first unit is represented by the first state of said bit signal and the corresponding bit of the second unit is represented by the second state of said bit signal, second means for transmitting a second signal when a bit of the second unit is represented by the first state of said bit signal and the corresponding bit of the second unit is represented by the first state of said bit signal, and third means for for transmitting a third signal whenever the corresponding bits of said first and second units are represented by the same state of said bit signal, each of the bit comparators comparing the lower order bits of the characters being responsive to the third means of the next higher order bit comparator to operate only when said third means transmits said third signal; first indicator means responsive to the first means of all of said bit comparators for transmitting a fourth signal whenever any of said first means transmits a first signal; second indicator means responsive to the second means of all of said bit comparators for transmitting a fifth signal whenever any of said second means transmits a second signal, and means responsive to said first and second indicator means for preventing the operation of the highest order bit comparator whenever said first or second indicator means transmits a fourth or fifth signal respectively.

8. Apparatus for serially comparing least-significant-character-first the characters of first and second units of data wherein each character is a coded combination of N bits in parallel, the bits being represented by the first and second states of a bit signal, comprising: at least $N-1$ bit comparators, each comparing a different order bit of the characters, each of said bit comparators including first means for transmitting a first signal when a bit of the first unit is represented by the first state of said bit signal and the corresponding bit of the second unit is represented by the second state of said bit signal, second means for transmitting a second signal when a bit of the second unit is represented by the first state of said bit signal and the corresponding bit of the second unit is represented by the first state of said bit signal, and third means for transmitting a third signal whenever the corresponding bits of said first and second units are represented by the same state of said bit signal, each of the bit comparators comparing the lower order bits of the characters being responsive to the third means of the next higher order bit comparator to operate only when said third means transmits said third signal; first two state storage means responsive to the first means of all of said bit comparators for assuming a first state and transmitting a fourth signal whenever any of said first means transmits a first signal; second two state storage means responsive to the second means of all of said comparators for assuming a second state and transmitting a fifth signal whenever any of said second means transmits a second signal; means responsive to said fourth signal for forcing said second two state storage means to assume a second state; and means responsive to said fifth signal for forcing said first two state storage means to assume a second state.

9. The apparatus of claim 8 for serially comparing controllably most-or-least-significant-character-first including means controllably responsive to said first and second two state storage means for controlling the operation of the highest order bit comparator.

10. Apparatus for serially comparing the characters of first and second units of data wherein each character is a coded combination of N bits in parallel, the bits being represented by push-pull signals, comprising: at least $N-1$ bit comparators, each of said bit comparators including an identical first "and" circuit responsive to the first phase of the push-pull signal representing a bit of the first unit of data and to the opposite phase of the push-pull signal representing the corresponding bit of the second unit of information, an identical second "and" gate responsive to the opposite phase of the push-pull signal representing said bit of the first unit of information and the first phase of the push-pull signal representing said corresponding bit of said second unit of information, a third "and" gate responsive to the first phase signal of push-pull signals representing said bits of the first and second units of information, a fourth "and" gate responsive to the opposite phase of the push-pull signals representing bits of the said first and second units of information, each of said first "and" gates of said bit comparators having the same number of inputs, each of said second "and" gates of said bit comparators having the same number of inputs, first "or" circuit responsive to said third and fourth "and" gates, all of the "and" gates of the lower order bit comparators under control of the first "or" circuit of the next higher bit comparator; a second "or" circuit responsive to the first "and" circuits of all of said bit comparators; a first flip-flop responsive to said second "or" circuit; a third "or" circuit responsive to the second "and" gates of all of said bit comparators; and a second flip-flop responsive to said third "or" circuit.

11. Apparatus for serially comparing most-significant-first the characters of first and second units of data wherein each character is a coded combination of N bits in parallel, the bits being represented by push-pull signals, comprising: at least $N-1$ bit comparators, each said bit comparators including a first "and" circuit responsive to the first phase of the push-pull signal representing a bit of the first unit of data and to the opposite phase of the push-pull signal representing the corresponding bit of the second unit of information, a second "and" gate responsive to the opposite phase of the push-pull signal representing said bit of the first unit of information and the first phase of the push-pull signal representing said corresponding bit of said second unit of information, a "third "and" gate responsive to the first phase signal of push-pull signals representing said bits of said first and second units of information, a fourth "and" gate responsive to the opposite phase of the push-pull signals representing said bits of the first and second units of information, a first "or" circuit responsive to said third "and" and fourth "and" gates, all the "and" gates of the next lower order bit comparators being under control of only the first "or" circuit of the next higher bit comparator; a second "or" circuit responsive to the first "and" circuits of all of said bit comparators; a first flip-flop responsive to said second "or" circuit; a third "or" circuit responsive to the second "and" gates of all of said bit comparators; a second flip-flop responsive to said third "or" circuit; and means responsive to said first and second flip-flops for controlling the operation of all of the "and" gates of the highest order bit comparator.

12. Apparatus for serially comparing least-significant-first the characters of first and second units of data wherein each character is a coded combination of N bits in parallel, the bits being represented by push-pull signals, comprising: at least $N-1$ bit comparators, each of said bit comparators including a first "and" circuit responsive to the first phase of the push-pull signal representing a bit of the first unit of data and to the opposite phase of the push-pull signal representing the corresponding bit of the second unit of information, a second "and" gate responsive to the opposite phase of the push-pull signal representing said bit of the first unit of information and the first phase of the push-pull signal representing said corresponding bit of said second unit of information, a third "and" gate responsive to the first phase signal of push-pull signals representing said bits of the first and second units of information, a fourth "and" gate responsive to the opposite phase of the push-pull signals representing said bits of the first and second units of information, a first "or" circuit responsive to said third and fourth "and" gates, all the "and" gates of the lower order bit comparators under control of the first "or" circuit of the next higher bit comparator; a second "or" circuit responsive to the first "and" circuits of all of said bit comparators; a first flip-flop having a set input terminal and a reset input terminal, said set input terminal being responsive to said second "or" circuit; a third "or" circuit responsive to the second "and" gates of all of said bit comparators; a second flip-flop having a set input terminal and a reset input terminal, said set input terminal being responsive to said third "or" circuit; the reset input terminal of said first flip-flop being responsive to said third "or" circuit; and the reset input terminal of said first flip-flop being responsive to said second "or" circuit.

13. Apparatus for serially controllably comparing least- or most-significant-character-first the characters of first and second units of data wherein each character is a coded combination of N bits in parallel, the bits being represented by push-pull signals, comprising: at least $N-1$ bit comparators, each of said bit comparators including a first "and" circuit responsive to the first phase of the push-pull signal representing a bit of the first unit of data and to the opposite phase of the push-pull signal representing the corresponding bit of the second unit of information, a second "and" gate responsive to the opposite phase of the push-pull signal representing said bit of the first unit of information and the first phase of the push-pull signal representing said corresponding bit of said second unit of information, a third "and" gate responsive to the first phase signal of push-pull signals representing said bits of the first "and" second units of information, a fourth and gate responsive to the opposite phase of the push-pull signals representing said bits of said first and second units of information, a first "or" circuit responsive to said third and fourth "and" gates, all of the "and" gates of the lower order bit comparators under control of the first "or" circuit of the next higher bit comparator; a second "or" circuit responsive to the first "and" circuits of all of said bit comparators; a first flip-flop having a set and a reset input terminal, said set input terminal being responsive to said second "or" circuit; a third "or" circuit responsive to the second "and" gates of all of said bit comparators; a second flip-flop having a set and a reset input terminal, said set input terminal being responsive to said third "or" circuit; the reset input terminal of the first flip-flop being responsive to said third "or" circuit; the reset input terminal of said second flip-flop being responsive to said second "or" circuit; and means controllably responsive to said first and second flip-flops for controlling the operation of the "and" gates of the highest order bit comparator.

14. The apparatus of claim 3 wherein each of said first means of said bit comparator has the same number of inputs and each of said second means of said bit comparator has the same number of inputs.

References Cited by the Examiner

UNITED STATES PATENTS

| | | | |
|---|---|---|---|
| 2,539,043 | 1/1951 | Verneaux | 340—149 |
| 2,831,987 | 4/1958 | Jones | 340—149 |
| 2,845,220 | 7/1958 | Bensky et al. | 340—149 |
| 2,885,655 | 5/1959 | Smolear | 340—149 |
| 2,889,534 | 6/1959 | Lubkin | 340—149 |
| 2,900,620 | 8/1959 | Johnson | 340—149 |
| 2,946,983 | 7/1960 | Borders | 340—149 |

MALCOLM A. MORRISON, *Primary Examiner.*

EVERETT R. REYNOLDS, IRVING L. SRAGOW, *Examiners.*